United States Patent
Gold et al.

(10) Patent No.: US 6,655,576 B2
(45) Date of Patent: Dec. 2, 2003

(54) PROCESS FOR DISASSEMBLING A BRAZED STRUCTURE

(75) Inventors: Daniel Gold, Vallejo, CA (US); Gary Dudek, Lisbon, CT (US); Loretta Lietzan, East Windsor, CT (US); James Moor, Torrington, CT (US); Will Glesener, Danville, CA (US); Mike Harris, Redwood Shores, CA (US)

(73) Assignee: United Technologies Corporation, Harford, CT (US)

( * ) Notice: Subject to any disclaimer, the term of this patent is extended or adjusted under 35 U.S.C. 154(b) by 95 days.

(21) Appl. No.: 10/107,231

(22) Filed: Mar. 26, 2002

(65) Prior Publication Data

US 2003/0183678 A1 Oct. 2, 2003

(51) Int. Cl.$^7$ .................. B23K 1/018; B23K 28/00; B23K 31/00; B23K 5/22
(52) U.S. Cl. .................. 228/264; 228/119; 228/191; 228/19
(58) Field of Search .................. 228/264, 19, 119, 228/191, 227, 230, 234.1, 21, 35; 29/402.01, 402.03, 402.11

(56) References Cited

U.S. PATENT DOCUMENTS

| | | | |
|---|---|---|---|
| 4,274,908 A | | 6/1981 | Fishter et al. |
| 4,293,089 A | * | 10/1981 | McCormick et al. ....... 228/215 |
| 4,302,246 A | | 11/1981 | Brindisi, Jr. et al. |
| 4,324,626 A | | 4/1982 | McGivern, Jr. |
| 4,606,944 A | * | 8/1986 | Lauchenauer ............... 427/296 |
| 5,305,941 A | * | 4/1994 | Kent et al. ..................... 228/19 |
| 5,439,637 A | | 8/1995 | Moyer |
| 5,871,139 A | * | 2/1999 | Moyer ......................... 228/264 |
| 5,901,898 A | * | 5/1999 | Strempke ..................... 228/19 |
| 6,186,387 B1 | * | 2/2001 | Lawrence et al. ......... 228/20.5 |

* cited by examiner

*Primary Examiner*—L. Edmondson
(74) *Attorney, Agent, or Firm*—Bachman & LaPointe, P.C.

(57) ABSTRACT

Brazed structures comprising hollow components having a closure component bonded thereto by a metallic brazing alloy for closing off an end of the hollow component are disassembled by locating a wire transport material in the hollow component and covering the open face of the hollow component with a wire fiber material. Heat is then applied to liquefy the brazing alloy which is drawn up into the metal wire fiber material by capillary affect created by the wire transport material.

14 Claims, 1 Drawing Sheet

PROCESS FOR DISASSEMBLING A BRAZED STRUCTURE

BACKGROUND OF THE INVENTION

The present invention is drawn to a process for disassembling a brazed structure and, more particularly, a brazed structure comprising a hollow component having a closure component bonded thereto by a metallic brazing alloy for closing off an end of the hollow component.

Brazing processes are known in the prior art for forming a metallic bond between two metal surfaces. Aircraft gas turbine engines rely heavily on a number of brazing processes. For example, open-face honeycomb structures, or air seals, are brazed for use in high temperature heat-resistance applications on lightweight aircraft engines. The unique characteristic of such air seal structures is that the core structure provides an effective seal for a stream of hot gas.

Several methods are known in the prior art for chemically separating brazed components. These approaches utilize leaching and stripping solutions. These methods are generally difficult to control and often lead to damage to the base metal. Such methods are disclosed, for example, in U.S. Pat. Nos. 4,274,908, 4,302,246, and 4,324,626.

U.S. Pat. Nos. 5,439,637 and 5,871,139 disclose processes for removing metallic brazing alloys from brazed joints by packing the joints with metallic powders and the like.

Naturally, it would be highly desirable to provide a process for removing metallic brazing alloy from honeycomb structures as defined above without the requirement of chemical acid stripping and the like.

SUMMARY OF THE INVENTION

The foregoing object is achieved by way of the present invention which provides a process for disassembling a brazed structure (for example open face honeycomb structures which are static parts and act as sealing surfaces in jet engines) comprising a hollow component having at least one hollow element and closure component bonded thereto by a metallic brazing alloy for closing off an end of the at least one hollow element wherein the at least one hollow element and closure component define an open faced cell. The process of the present invention comprises the steps of locating in the cell a wire transport material, covering the open faced cell with a metal wire fiber material which penetrates the cell and contacts the wire transport material, and heating the hollow component to sufficient temperature wherein the metallic brazing alloy flows through the wire transport material and onto the metal wire fiber material. In accordance with the present invention, the wire transport material comprises a packing of metal wires of various shapes and sizes which form capillary passages at the interstitial locations between the wires.

Further objects and advantages of the present invention will appear hereinbelow.

DETAILED DESCRIPTION

Figure 1:
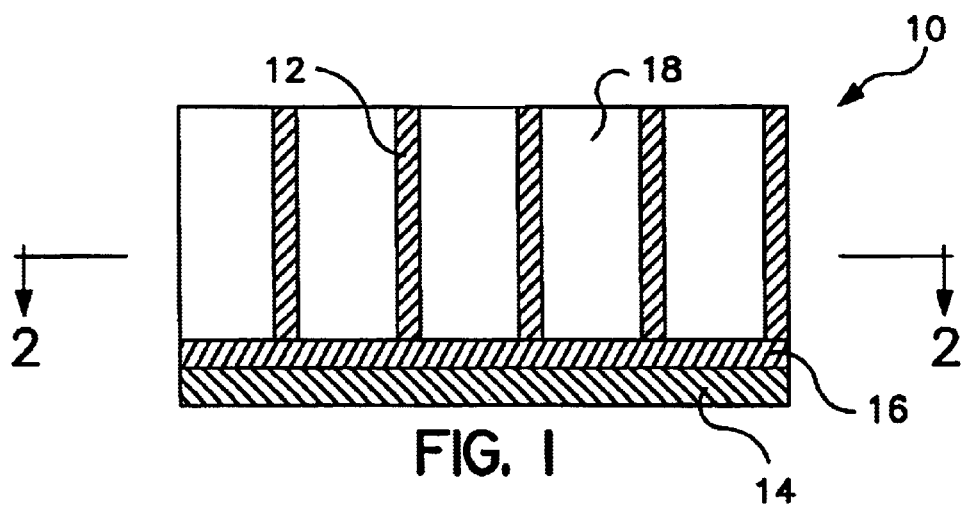
FIG. 1 is a partial sectional side view of an open-face honeycomb brazed structure which may be disassembled in accordance with the process of the present invention.
Figure 2:
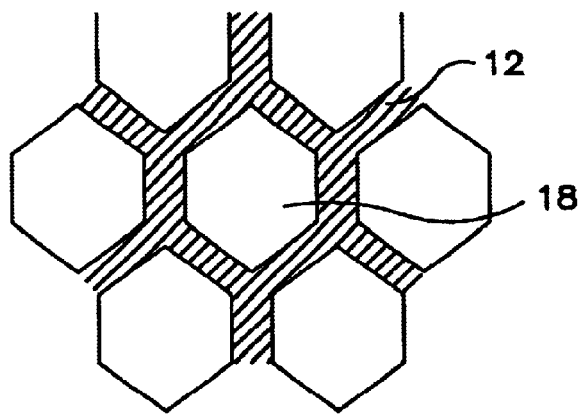
FIG. 2 is a partial top view of the open-face honeycomb structure of FIG. 1.

With reference to FIGS. 1 and 2, a brazed structure 10 includes an open-faced honeycomb structure or component 12 and a closure component 14 which are bonded together by a metallic brazing alloy 16 to define a plurality of cells 18.

Figure 3:
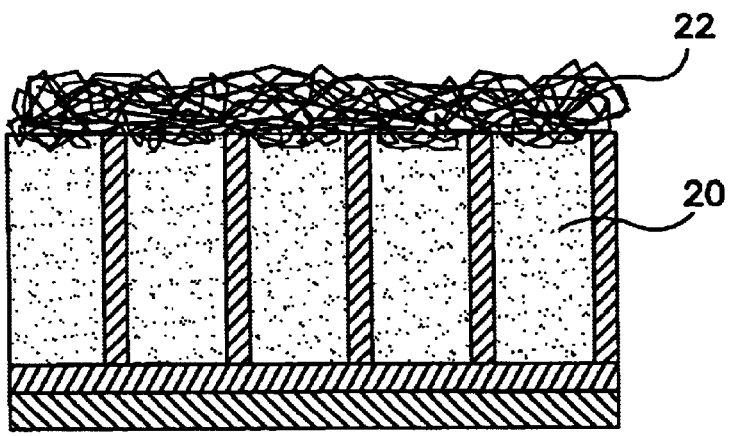
FIG. 3 is a view similar to FIG. 1 showing the open-face honeycomb structure loaded with the wire transport material and metal wire fiber material in accordance with the process of the present invention.

With reference to FIG. 3, the cells 18 are packed with a wire transport material 20. The wire transport material fills the cells and may slightly overflow the cells. As used in the instant specification, wire transport material means a packing of metal wires of various sizes and shapes which form capillary passages at the interstitial locations between the wires. The wire transport material comprises a metal material having a melting temperature greater than that of the metallic brazing alloy 16 used to bond the honeycomb structure 12 to the closure component 14. The wire transport material 20 must also be wettable by the metallic brazing alloy. In accordance with the present invention, the wire transport material may be formed of a metal selected from the group consisting of aluminum, cobalt, copper, iron, nickel, their alloys, carbon steel, stainless steel and mixtures thereof. Particularly suitable metals include stainless steels and carbon steels. As noted above, the wire transport material is formed of metal wires of various shapes and sizes. The metal wires have diameters of between 0.005" to 0.050", a length of up to 0.500" and an interstice of between 0.0001" to 0.015". In the preferred embodiment, the metal has a diameter of between 0.010" to 0.030", a length of up to 0.500" and an interstice of between 0.001" to 0.007". The interstice or spacing is such that it acts as a capillary passageway for the liquid brazing alloy as will be discussed hereinbelow. Located on top of the cell or honeycomb structure 12 is a metal wire fiber material 22 which contacts the wire transport material 20. The metal wire fiber material 22, preferably, comprises a commercial grade steel wool material of between #0000 and #4. The steel wool material has a diameter of between 0.0006" to 0.008". The wire transport material 20 creates a differential pressure between the bottom of the cell (the metallic brazing alloy 16) and the metal wire fiber material 22 wherein the differential pressure is between 2.5 psia to 12.6 psia. The purpose of the differential pressure will be explained with reference to the process as set forth hereinbelow.

The process of the present invention comprises the steps of: locating in a cell a wire transport material, covering the cell with a metal wire fiber material which contacts the wire transport material, heating the cell to sufficient temperature wherein the metallic brazing alloy flows through interstice of the wire transport material and onto the metal wire fiber material where the liquid brazing alloy is solidify. The components are thereafter separated and the metal wire fiber material with the solidified brazing alloy can be removed (either before or after separation of the component parts).

The process of the present invention is preferably performed in an inert, hydrogen or vacuum furnace atmosphere in order to reduce oxidation and promoting wetting of the wire transport material by the liquid brazing alloy. Generally, the debrazing temperature is not substantially higher than the original brazing temperature and is normally between 25–50° F. above the original brazing temperature. Temperatures significantly higher can alter the metallurgical structural properties of the component parts and adversely affect the mechanical properties. It has been found that the total cycle time is generally between 10–30 minutes at the debrazing temperature.

The preferred materials for the wire transport material are carbon and stainless steel wire. As noted above, the wire transport material is packed into the cell to form interstices of between 0.001" to 0.015", preferably 0.001" to 0.007". These interstices act as capillary passageways and are filled in seconds upon melting of the metallic brazing alloy. The metallic brazing alloy flows upward as a result of capillary action. The metal transport material which creates a differential pressure between the cell at the brazing alloy and the wire fiber material above the cells helps draw the liquid brazing alloy onto the metal wire fiber material (by providing a wicking affect) where the brazing material is solidified. The brazing material is then removed from the hollow component by simply removing the metal wire fiber material. Upon removal of sufficient amounts of the brazing material, the component parts may be disassembled.

EXAMPLE

A fifth stage low pressure, outer air seal honeycomb segment of a PW 4000 jet engine was selected as a candidate component to utilize the thermal brazing process of the present invention. A set of 20 engine run parts were cleaned per UAL GN/MM 4-0-06 process 2N. The air seal segment parent material was AMS5536, the honeycomb was made of Hastelloy X and the braze metal was AMS4777.

The honeycomb cells of the segment were filled with 510 grams of cut wire. The cut wire was made of carbon steel of 0.014-inch nominal diameter that conformed to AMS2431/3. Honeycomb cells were filled to the top with some allowed overflow. Specific preparation attention was focused on the edges of the segment to insure peripheral cells were filled. Loose cut wire was removed from all non-honeycomb regions to prevent unwanted flow locations.

The cut wire fill area was sprayed with a standard braze powder binder and allowed to dry for 45 minutes. The air seals were inverted and checked to insure cut wire did not fall out. Three commercially available pads of #0000 steel wool were placed (lengthwise) on top of cells containing the cut wire. All cells were covered with steel wool and overhang was trimmed.

The air seal segments, with steel wool attached, were placed in a vacuum furnace with honeycomb face down. Strips of fiber frax cloth were cut to dimension (10 inch length and 3½ inch wide) and placed over the air seal. Fiber frax cloth is used to keep liquid braze metal from flowing in unwanted regions. Another air seal, containing cut wire and steel wool, was placed on top followed by another sheet of fiber frax cloth. Four stacks of five air seals (separated by cloth) were placed in the furnace. Weights were placed on top of the sandwich stacks to ensure equal pressure on steel wool.

The furnace cycle began by evacuating chamber to 0.56-micron vacuum. The load was heated to 1800° F.±25° F. and held for 10 minutes. Heating rate was 30° F./min. The load was then heated to 1950° F.±25° F. at 20° F./min and held for 30 minutes. The load was cooled to 1800° F.±25° F. at 15° F./min and then quench cooled to 300° F.

Honeycomb, cut wire and steel wool with the brazing alloy was easily removed from the air seal segment with pneumatic and hand chisel. The component parts were than separated.

The invention will be further described with reference to the following example.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for disassembling a brazed structure comprising a hollow component having at least one hollow element and a closure component bonded thereto by a metallic brazing alloy for closing off an end of the at lest one hollow element so as to define therewith an open faced cell, comprising the steps of:

(a) locating in the cell a wire transport material;
   (b) covering the open faced cell with a metal wire fiber material which penetrates the cell and contacts the wire transport material;
   (c) heating the hollow component to sufficient temperature wherein the metallic brazing alloy flows through the wire transport material and onto the metal wire fiber material; and
   (d) separating the hollow component from the closure component.

2. A process according to claim 1, wherein the hollow component comprises a honeycomb structure having a plurality of hollow elements.

3. A process according to claim 2, wherein the closure component closes off an end of a plurality of the hollow elements of the honeycomb structure.

4. A process according to claim 1, wherein the metallic brazing alloy solidifies on the metal wire fiber material.

5. A process according to claim 4, wherein metal wire fiber material with the solidified metallic brazing alloy is removed from the hollow component.

6. A process according to claim 1, wherein the wire transport material comprises a metal material having a melting temperature greater than that of the metallic brazing alloy and is wettable by the metallic brazing alloy.

7. A process according to claim 6, wherein wire transport material is a metal material selected from the group consisting of aluminum, cobalt, copper, iron, nickel, their alloys, carbon steel, stainless steel and mixtures thereof.

8. A process according to claim 6, wherein the wire transport material is selected from the group consisting of carbon steel, stainless steel and mixtures thereof.

9. A process according to claim 1, wherein the wire transport material comprises a metal having a diameter of between 0.005" to 0.050", a length of up to 0.500" and an interstice of between 0.0001" to 0.015".

10. A process according to claim 1, wherein the wire transport material comprises a metal having a diameter of between 0.010" to 0.030", a length of up to 0.500" and an interstice of between 0.001" to 0.007".

11. A process according to claim 1, wherein the metal wire fiber material comprises a commercial grade steel wool material.

12. A process according to claim 11, wherein the commercial grade is between #0000 and #4.

13. A process according to claim 11, wherein the steel wool material has a diameter of between 0.0006" to 0.008".

14. A process according to claim 1, wherein the metal transport material creates a differential pressure between the brazing alloy and the metal wire fiber material of between 2.5 psia to 12.6 psia.

* * * * *

UNITED STATES PATENT AND TRADEMARK OFFICE
CERTIFICATE OF CORRECTION

PATENT NO. : 6,655,576 B2
DATED : December 2, 2003
INVENTOR(S) : Daniel B. Gold et al.

It is certified that error appears in the above-identified patent and that said Letters Patent is hereby corrected as shown below:

<u>Title page,</u>
Item [73], Assignee, add the second Assignee as follows:
-- United Airlines Corporation
   1200 E. Algonquin Road
   Elk Grove Township, IL 60007 --.

Signed and Sealed this

Eighteenth Day of October, 2005

JON W. DUDAS
*Director of the United States Patent and Trademark Office*